United States Patent [19]
Giffin, III

[11] Patent Number: 5,261,227
[45] Date of Patent: Nov. 16, 1993

[54] VARIABLE SPECIFIC THRUST TURBOFAN ENGINE

[75] Inventor: Rollin G. Giffin, III, Cincinnati, Ohio

[73] Assignee: General Electric Company, Cincinnati, Ohio

[21] Appl. No.: 982,167

[22] Filed: Nov. 24, 1992

[51] Int. Cl.$^5$ .............................................. F02K 3/02
[52] U.S. Cl. ................................. 60/226.1; 60/226.3
[58] Field of Search ................. 60/226.1, 226.3, 262

[56] References Cited

U.S. PATENT DOCUMENTS

| | | |
|---|---|---|
| 3,528,246 | 9/1970 | Fischer .................................. 60/226 |
| 3,729,957 | 5/1973 | Petrie et al. ....................... 60/226 R |
| 3,867,813 | 2/1975 | Leibach ................................ 60/226.1 |
| 4,043,121 | 8/1977 | Thomas et al. ....................... 60/204 |
| 4,050,242 | 9/1977 | Dusa .................................... 60/226.1 |
| 4,055,042 | 10/1977 | Colley ............................... 60/226 R |
| 4,080,785 | 3/1978 | Koff .................................... 60/262 |
| 4,288,983 | 9/1981 | O'Rourke, Jr. ................... 60/226 R |

FOREIGN PATENT DOCUMENTS

2165892 4/1986 United Kingdom ............... 60/226.1

OTHER PUBLICATIONS

W. S. Willis, "Quiet Clean Short-Haul Experimental Engine (QCSEE) Final Report," Aug. 1979, pp. cover, 15, and 17.
General Electric Company, "Quite Clean Short-Haul Experimental Engine (QCSEE) UTW Fan Preliminary Design," Feb. 1975, pp: cover, 2 and 3.
General Electric Company, "Quiet Clean Short-Haul Experimental Engine (QCSEE) Preliminary Analyses and Design Report, vol. II" Oct. 1974, pp: cover, 465, 477, 478, 517, 522, and 523.
General Electric Company, "Quite Clean Short-Haul Experimental Engine (QCSEE) Preliminary Analyses and Design Report, vol. I," Oct. 1974, pp: cover, 13, 14, 17, 19, 140, 143, 151, and 183.

Primary Examiner—John J. Vrablik
Assistant Examiner—W. J. Wicker
Attorney, Agent, or Firm—Jerome C. Squillaro

[57] ABSTRACT

An aircraft turbofan engine and method of operation effect variable specific thrust. The engine includes a fan disposed in a fan casing and a booster compressor disposed in a first flow splitter and powered by a core engine. A second flow splitter is disposed inside the fan casing and defines fan outer and inner ducts. The booster compressor includes at least one stage of rotor blades each having a shroud and an integral rotor flade extending radially outwardly therefrom into the fan inner duct. The fan outer duct includes a variable area first exhaust nozzle disposed at an aft end of the fan casing and is positionable in a first position to permit shifting of a portion of the fan air from the outer duct to the inner duct for flow between the flades to vary specific thrust of the engine.

7 Claims, 3 Drawing Sheets

VARIABLE SPECIFIC THRUST TURBOFAN ENGINE

The present invention relates generally to aircraft turbofan gas turbine engines, and, more specifically, to a high bypass family of turbofan engines.

BACKGROUND OF THE INVENTION

Commercial passenger-carrying aircraft are typically powered by high bypass turbofan gas turbine engines for propelling the aircraft at subsonic speeds. Aircraft are configured for carrying different numbers of passengers over different ranges and, therefore, require engines having different maximum thrust capability. Furthermore, the engine is specifically configured to match the thrust levels required by the aircraft to reduce specific fuel consumption (SFC) and thereby reduce total fuel burned.

Accordingly, an engine designed for one aircraft configuration having a specific maximum thrust capability and a corresponding low SFC operating range is typically not usable for a different aircraft application requiring a different level of maximum thrust and different low SFC operating range. However, in order to reduce development and operational costs, aircraft engines are typically developed in families sharing as many common components as possible while reducing unique components for each design application for covering a range of maximum thrust capability and corresponding low SFC operational ranges.

For example, an engine family may use a common core engine including a high pressure compressor, combustor, and high pressure turbine for providing combustion gases to a low pressure turbine for powering the fan. The fan size, or outer diameter, is a primary factor in the maximum thrust capability of the engine. Larger fan diameter allows increased propulsion thrust from the engine, but also increases size and weight of the engine which adversely affect fuel burn. Uninstalled SFC may be improved for subsonic turbofan engines as fan pressure ratio is reduced. However, as fan pressure ratio is reduced the airflow through the fan must increase to retain the required maximum thrust from the engine. This can best be appreciated by the fundamental relationship between specific thrust, which is the pounds of thrust per pound of airflow, and the fan pressure ratio. Specific thrust is reduced as the fan pressure ratio is reduced. Therefore, to improve SFC by reducing fan pressure ratio, an increase in fan airflow is required which, in turn, requires a larger diameter fan which increases engine weight and increases nacelle scrubbing and interference drags. These effects diminish the uninstalled advantage of a low fan-pressure ratio engine to the point that when the engine is installed in the aircraft, the overall efficiency of operation is diminishingly reduced.

Furthermore, a plot of SFC versus thrust for a given engine includes a conventionally known throttle hook wherein the plot is generally U-shaped with SFC having a minimum value at an intermediate thrust level of the engine. The width of the bottom, or bucket, of the throttle hook, which is the thrust range over which the SFC remains substantially constant, is an important parameter of the engine. For example, a relatively wide bucket allows a given engine to be used for a wider range of different aircraft configurations which operate at a substantial amount of time in the bucket region for reducing fuel consumption. Such applications may include smaller and lighter aircraft, or the end of a long flight where most of the aircraft fuel has been burned off and, therefore, requires less thrust for cruise operation.

Both a wider throttle hook for a given engine family, and a larger range of maximum thrust therefrom increase the number of different aircraft configurations which may effectively use the engine family.

SUMMARY OF THE INVENTION

An aircraft turbofan engine and method of operation effect variable specific thrust. The engine includes a fan disposed in a fan casing and a booster compressor disposed in a first flow splitter and powered by a core engine. A second flow splitter is disposed inside the fan casing and defines fan outer and inner ducts. The booster compressor includes at least one stage of rotor blades each having a shroud and an integral rotor flade extending radially outwardly therefrom into the fan inner duct. The fan outer duct includes a variable area first exhaust nozzle disposed at an aft end of the fan casing and is positionable in a first position to permit a portion of the fan air to be shifted from the outer duct to the inner duct to increase the flow to the flades to vary specific thrust of the engine.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
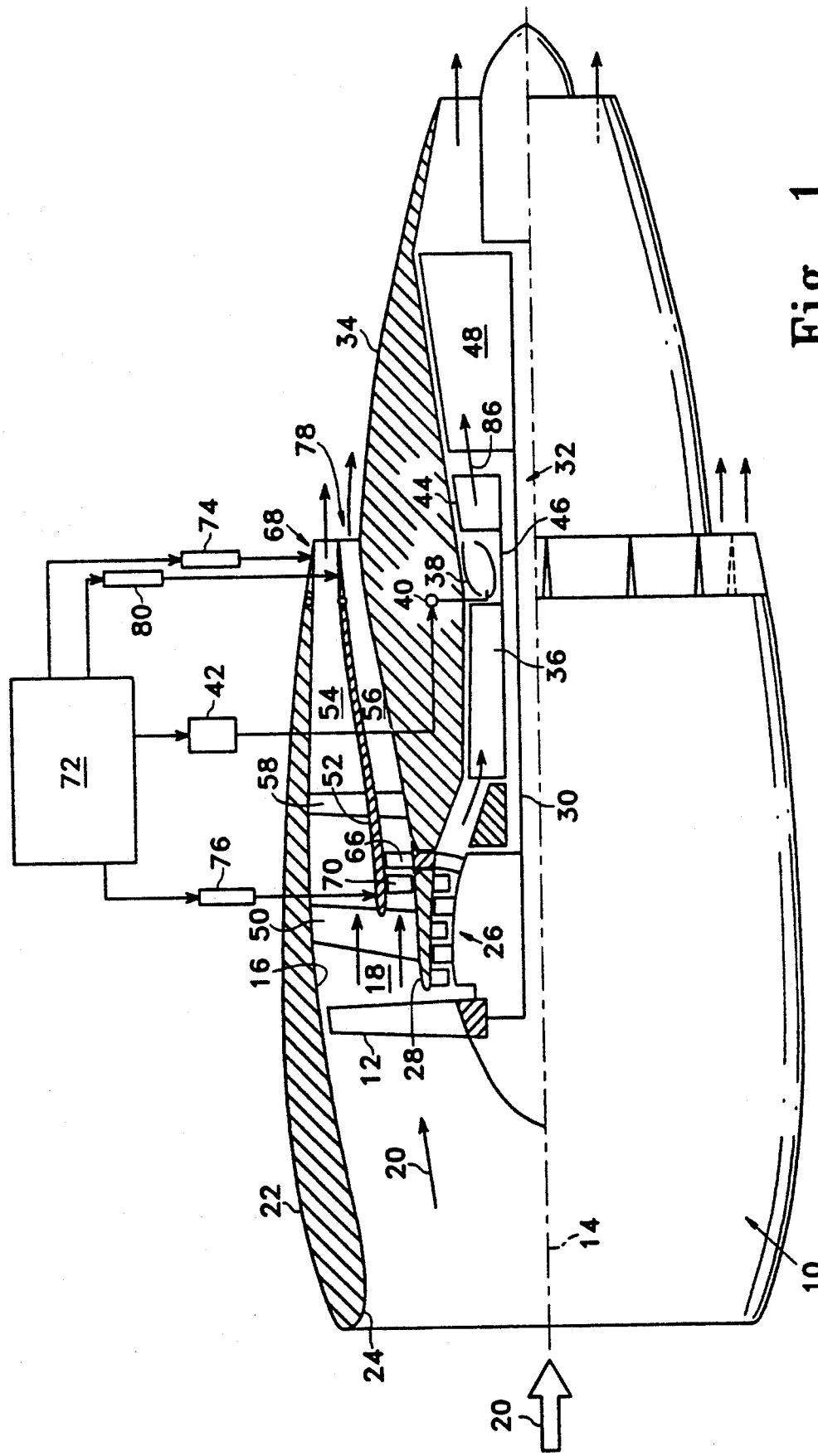
FIG. 1 is a longitudinal, partly sectional schematic representation of an exemplary high bypass turbofan aircraft engine in accordance with one embodiment of the present invention.

Illustrated schematically in FIG. 1 is an exemplary turbofan gas turbine engine 10 effective for powering an aircraft (not shown) in flight at subsonic speeds. The engine 10 includes a conventional fan 12 having a plurality of circumferentially spaced apart fan blades extending radially outwardly from a rotor disc disposed coaxially about a longitudinal centerline axis 14 of the engine 10. The fan 12 is disposed in an annular outer, or fan, casing 16 which defines an annular fan duct 18 for receiving air 20 which flows through the fan 12 and is compressed thereby and suitably discharged from the engine 10 for generating thrust to power the aircraft. The fan casing 16 is surrounded by a conventional nacelle 22 having an inlet 24 at its forward end for receiving the air 20. A first, or booster, compressor 26 is disposed downstream of the fan 12 and in serial flow communication therewith inside an annular first flow splitter 28. The fan 12 and the booster compressor 26 are fixedly joined together by a common first shaft 30 and powered by a conventional core engine 32.

The core engine 32 is disposed coaxially about the centerline axis 14 inside an annular inner casing 34 and includes a conventional second, or high pressure, axial compressor 36 which is disposed in flow communication with the booster compressor 26. The inner casing 34 extends aft of the first splitter 28 and is generally coextensive therewith at a common radius from the centerline axis 14, with the outer circumferences of the first splitter 28 and the inner casing 34 defining the inner boundary of the fan duct 18 downstream of the fan 12, with the outer boundary of the fan duct 18 being defined by the inner circumference of the fan casing 16.

The core engine 32 further includes a conventional annular combustor 38 disposed in the casing 34 and in flow communication with the second compressor 36. Conventional fuel injectors 40 suitably receive fuel from a conventional means for supplying fuel 42 for discharge into the combustor 38. The core engine 32 further includes a conventional first, or high pressure turbine (HPT) 44 also disposed inside the inner casing 34 and in flow communication with the combustor 38. The HPT 44 is fixedly joined to the second compressor 36 by a conventional second shaft 46 for driving the second compressor 36.

A conventional second, or low pressure turbine (LPT) 48 is also disposed in the casing 34 and in flow communication with the HPT 44. The LPT 48 is fixedly joined to the fan 12 and the booster compressor 26 by the first shaft 30 for driving both the fan 12 and the booster compressor 26 in a conventional manner.

The second compressor 36, the HPT 44, and the LPT 48 are conventional with each including conventional rotor blades joined to rotor discs attached to the respective shafts 30, 46, and with conventional stator nozzles disposed upstream of each row or stage of respective rotor blades.

A plurality of circumferentially spaced apart conventional first outlet guide vanes (OGVs) 50 extend radially between the fan casing 16 and the first splitter 28 for conventionally straightening flow of the fan air 20 discharged from the fan 12. In accordance with one embodiment of the invention, an annular second flow splitter 52 is disposed aft of the fan 12 in the fan duct 18 and is spaced radially between the fan casing 16 and the inner casing 34 and first splitter 28 to divide the fan duct 18 into two concentric portions, i.e., to define a fan radially outer duct 54, and a fan radially inner duct 56.

Figure 2:
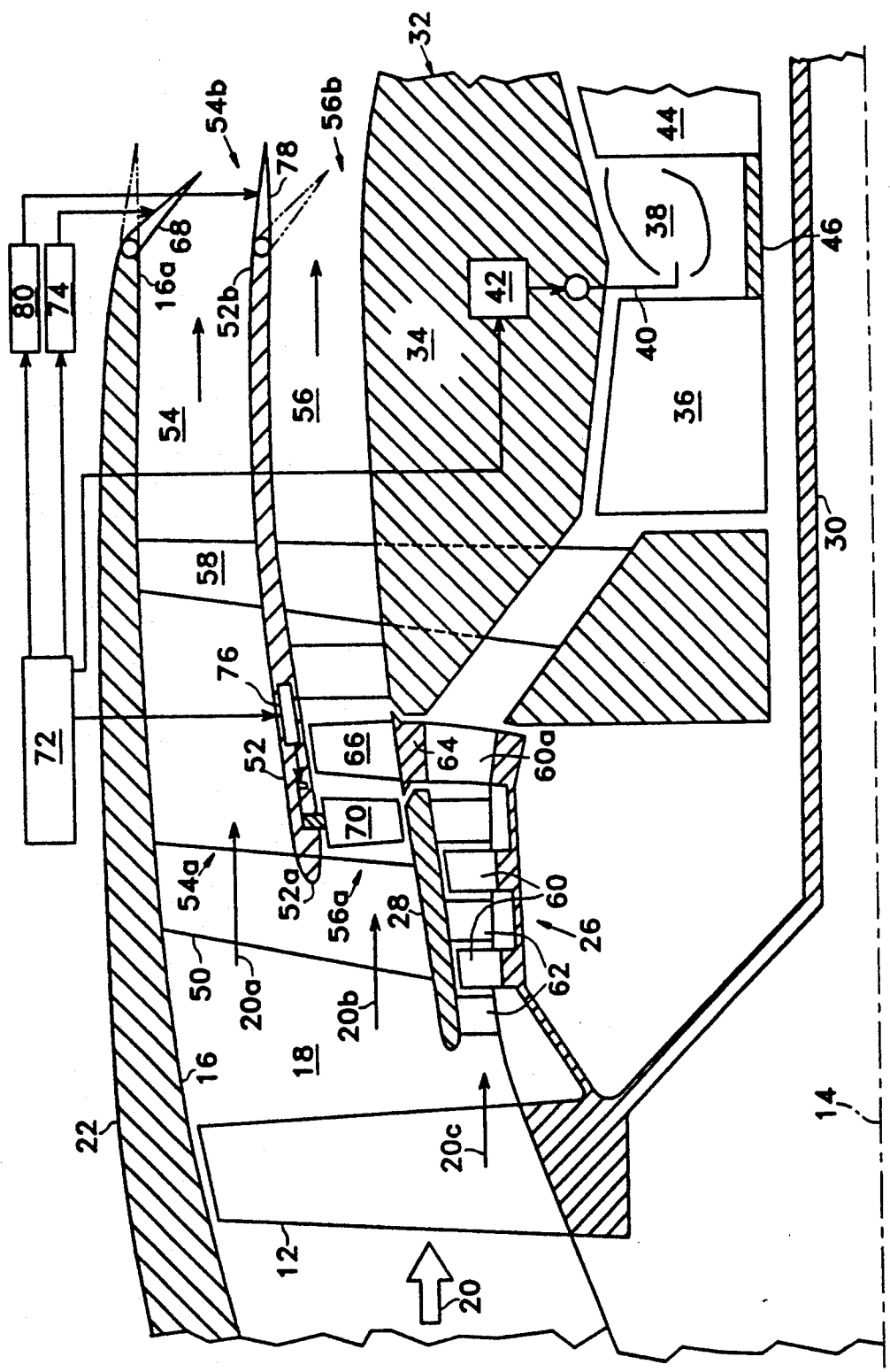
FIG. 2 is an enlarged view of the fan region of the engine illustrated in FIG. 1.

As shown in more particularity in FIG. 2, the second splitter 52 includes a leading edge or forward end 52a defining with the fan casing 16 an inlet 54a of the outer duct 54, and defining with the first splitter 28 an inlet 56a of the fan inner duct 56. A plurality of circumferentially spaced apart frame struts 58 are disposed downstream of the first OGVs 50 and extend radially inwardly from the fan casing 16 through the intermediate portion of the second splitter 52 and radially inwardly through the forward portion of the inner casing 34 for providing a suitable frame in the engine 10 in a conventional manner.

The booster compressor 26 conventionally includes one or more stages of compressor rotor blades 60 fixedly joined to the first shaft 30, through the fan disc, for example, with respective rows or stages of stator vanes 62 disposed upstream therefrom.

The first and second splitters 28 and 52 are effective for splitting the fan air 20 discharged from the fan 12 during operation into separate and discrete radially outer, middle, and inner portions or flows 20a, 20b, and 20c, respectively. The fan 12 is conventionally configured for initially compressing the fan air 20 channeled therethrough with a suitable first pressure rise $P/P_1$. The first splitter 28 is effective for channeling the so compressed fan air inner flow 20c through the booster compressor 26, and into the core engine 32, for supercharging the inner flow 20c with a second pressure ratio $P/P_2$ being suitably greater than the first pressure $P/P_1$. The second splitter 52 is effective for separately channeling the fan air outer and middle flows 20a, 20b from the operating fan 12, and separately discharging such flows from the engine 10 at different pressure ratios thereof to vary specific thrust in accordance with the present invention.

More specifically, at least one stage or row of the rotor blades 60 of the booster compressor 16 is used for obtaining a different pressure ratio of the fan air middle flow 20b through the inner duct 56 relative to the outer flow 20a. In the exemplary embodiment illustrated in FIG. 2, the last stage of the booster compressor blades, designated 60a, is modified in accordance with the present invention so that each blade 60a has an integral shroud 64 disposed coextensively at a common radius from the centerline axis 14 with the aft end of the first splitter 28 and the forward end of the inner casing 34 for providing a flow boundary therewith. The shrouds 64 provide an outer boundary for the inner flow 20c channeled through the booster compressor 26 into the second compressor 36 of the core engine 32, and provide an inner boundary for the middle flow 20b flowing through the fan inner duct 56. Each of the compressor blades 60a further includes an integral rotor flade 66 in the form of a conventional airfoil which extends radially outwardly from the shroud 64 in the fan inner duct 56. The flade 66, is, therefore, rotated along with its respective compressor blade 60a on the first shaft 30. In accordance with one object of the present invention, at least one stage of flades 66 are used to vary the cycle of the engine 10 and provide a different pressure rise, i.e., third pressure rise $P/P_3$ across the flades 66 in the fan inner duct 56, than the first pressure rise $P/P_1$ from the fan 12 itself in the fan air outer flow 20a channeled through the fan outer duct 54 to vary specific thrust of the engine 10.

Also in accordance with the present invention, a conventional variable area first exhaust nozzle 68 in the form of a plurality of circumferentially adjoining pivotable flaps is disposed at an aft end 16a of the fan casing 16 and defines with the second splitter 52 an outlet 54b of the fan outer duct 54 for discharging the fan air outer flow 20a therefrom to the atmosphere. The outer duct outlet 54b has a selectively variable discharge flow area, with the first exhaust nozzle 68 being positionable in a first position shown in solid line in FIG. 2 in a suitably closed position to reduce the outer duct outlet flow area for controlling the operating line of the fan 12 to permit shifting of a portion of the fan air 20 from the outer duct 54 to the inner duct 56 for flow through the flade stage between the flades 66 to vary specific thrust of the fan air channeled through both the outer and inner ducts 54, 56. By suitably shifting the fan air 20 between the outer and inner ducts 54, 56, the effect of the flades 66 acting on the fan air middle flow 20b relative to the fan air outer flow 20a may be suitably changed for varying operation of the engine 10.

In the preferred embodiment of the present invention, the engine 10 further includes a row of conventional variable inlet guide vanes (VIGVs) 70 disposed in the inner duct 56 between the inlet 56a and the flade 66 for varying the fan air middle flow 20b therethrough to effect shifting of the fan air 20 from the outer duct 54 to the inner duct 56. Suitable means are provided for controlling operation of the core engine 32, the VIGVs 70, and the first exhaust nozzle 68 and include a conventional controller 72 which may take the form of a conventional digital electronic control (DEC) which is suitably operatively joined to the fuel supply 42 for controlling the power output of the core engine 32; to a conventional first actuator assembly 74 having conventional pneumatic or hydraulic actuators and linkages for pivoting the flaps of the first exhaust nozzle 68; and to a conventional second actuator assembly 76 also including conventional pneumatic or hydraulic actuators and linkages for suitably rotating the VIGVs 70 for controlling the amount of airflow therethrough.

The controller 72 is suitably operable to position the VIGVs 70 in a first or generally open position thereof to increase flow of the fan air 20 through the inner duct 56 and through the flade stage between the flades 66, and concurrently to position the first exhaust nozzle 68 in its first position to reduce flow of the fan air 20 therethrough for controlling the operating line of the fan 12 in a conventional fashion. The controller 72 is also effective to position the VIGVs 70 in a second, or generally closed, position to decrease flow of the fan air 20 through the inner duct 56, and concurrently to position the flaps of the first exhaust nozzle 68 in a second, or generally open position thereof (shown in phantom in FIG. 2) to increase flow of the fan air 20 through the outer duct 54 and the first exhaust nozzle 68. In normal operation of the engine 10, the first exhaust nozzle 68 is open and the VIGVs 70 are closed for minimizing the fan air middle flow 20b through the inner duct 56 and maximizing the fan air outer flow 20a through the outer duct 54. In this way, thrust is developed primarily from the fan air outer flow 20a discharged from the outer duct 54, which has undergone a single pressure rise, i.e. the first pressure rise $P/P_1$, upon passing through the fan 12. This first pressure rise $P/P_1$ may be suitably low in value, for example about 1.5 for reducing specific fuel consumption (SFC) during operation of the engine 10 during all modes of operation up to maximum thrust therefrom. The closed VIGVs 70 will minimize the fan air middle flow 20b and the pressure ratio of the flades 66 through the inner duct 56 and decrease power required by the LPT 48 for driving the flades 66.

Figure 3:
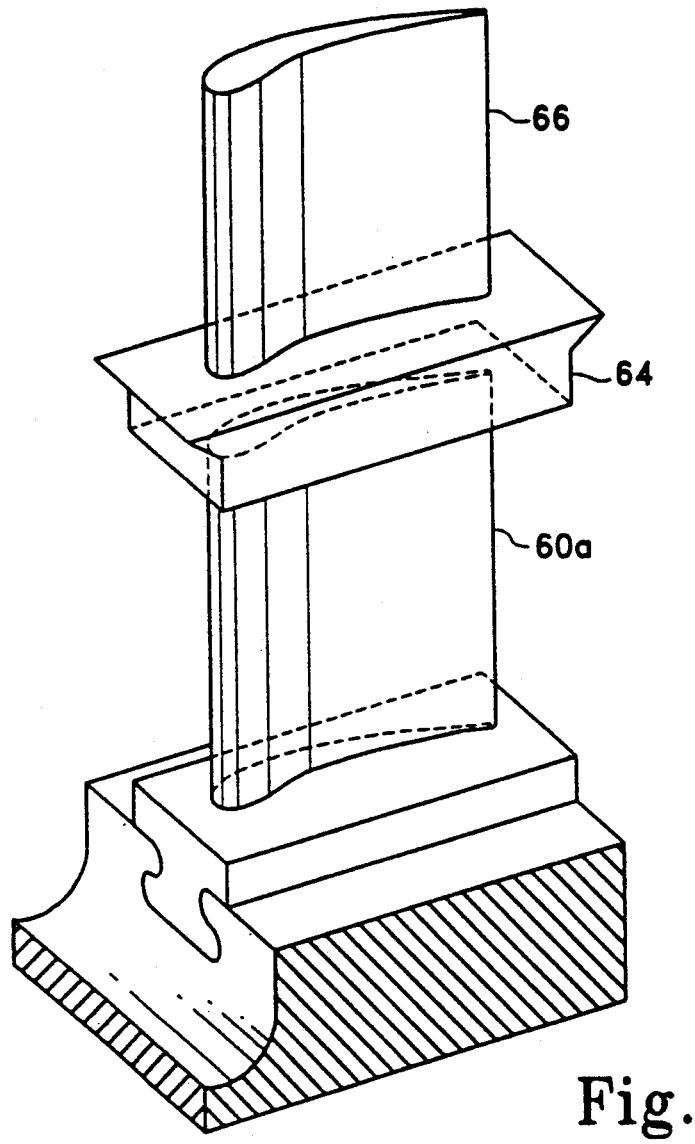
FIG. 3 is a schematic perspective view of an exemplary booster compressor blade, shroud, and flade used in the engine illustrated in FIGS. 1 and 2.

In the embodiment illustrated in FIG. 2, the maximum thrust produced by the engine 10 may be increased over that available from solely the fan 12 by configuring the rotor flades 66 in the form of conventional compressor blades as shown schematically in FIG. 3 for additionally compressing the fan air 20 channeled therebetween from the fan 12 for increasing specific thrust of the fan air 20 discharged from the engine 10.

More specifically, by operating the fan 12 at its maximum speed and airflow therethrough, and shifting a portion of the fan air outer flow 20a into the fan air middle flow 20b at the maximum speed and airflow condition of the fan 12, the flades 66 are used to change the third pressure rise $P/P_3$, which, in the exemplary embodiment shown is effective for further compressing the fan air middle 20b for increasing the third pressure ration $P/P_3$ for increasing specific thrust of the engine 10.

By operating the fan 12 at its maximum operating speed for obtaining a maximum, and constant airflow therethrough, the controller 72 positions the VIGVs 70 and the first exhaust nozzle 68 in their first positions at the fan maximum speed for increasing the fan air middle flow 20b at the expense of a reduction of the fan air outer flow 20a, with the increased quantity of fan air middle flow 20b undergoing an additional pressure rise through the flades 66 which increases specific thrust and, therefore, maximum thrust of the engine 10 for a given size of the fan 12 in this high-thrust mode of operation.

In this way, for a given size and airflow rate of the fan 12, additional thrust may be obtained therefrom by providing compressor flades 66 which further increase the pressure ratio, with the third pressure ratio $P/P_3$ being greater than the first pressure ratio $P/P_1$, and for example having a value of 2.0 or more. The fan 12 may remain relatively small having a relatively low pressure ratio, i.e. $P/P_1$, for reducing specific fuel consumption up to its maximum operating speed, with additional pressure ratio, i.e., $P/P_3$, being obtained from operation of the flades 66 with SFC being a minor factor since operation at the maximum thrust level is temporary.

At speeds of the fan 12 below its maximum speed, and maximum airflow thereof, the controller 72 positions the VIGVs 70 and the first exhaust nozzle 68 in their second positions for shifting most of the fan air 20 into the outer duct 54 instead of the inner duct 56. In this way, the engine 10 may be returned to normal, part-power/low-thrust mode of operation having reduced specific fuel consumption.

Accordingly, a family of engines 10 having a common diameter fan 12 may be developed with an increased range of maximum thrust therefrom by suitably varying the configuration of the booster compressor 26 and the flades 66. One or more stages of the flades 66 may be used, with conventional fixed or variable stator vanes disposed upstream of each flade stage, with the pressure rise across the flade stages and airflow size of the flades 66 being selected for each application for obtaining the required maximum thrust from the engine 10 with the given and common fan 12. The use of the flades 66 also improves the width or range of the throttle hook bucket described above which further increases the applicability of the flade-containing engine 10 for various aircraft configurations as well as the ability to operate at various thrust levels at minimum SFC.

Also in accordance with the present invention, the fan outer and inner ducts 54, 56 are separate and distinct for allowing proper operation of the flades 66. In the embodiment illustrated in FIG. 2, the second splitter 52 has an aft end 52b disposed radially inwardly from the fan casing aft end 16a in a generally common axial plane. The engine 10 may further include a conventional variable area second exhaust nozzle 78 also in the exemplary form of a plurality of circumferentially adjoining pivotable flaps disposed at the second splitter aft end 52b which define with the inner casing 34 an outlet 56b of the inner duct 56 which is separate and independent of the outer duct outlet 54b for discharging the fan air middle flow 20b therefrom directly to the atmosphere. The inner duct outlet 56b also has a selectively variable discharge flow area which is obtained by pivoting the flaps of the nozzle 78 by a conventional third actuator assembly 80 which includes conventional pneumatic or hydraulic actuators and linkages operatively joined to the controller 72. The controller 72 is effective for positioning the second exhaust nozzle 78 in a first relatively open position shown in solid line in FIG. 2 to increase the inner duct outlet flow area when the VIGVs 70 and the first exhaust nozzle 68 are disposed in their respective first positions, and are also positionable in a second relatively closed position shown in phantom line in FIG. 2 to decrease the inner duct outlet flow area when the VIGVs 70 and the first exhaust nozzle 68 are disposed in their second positions.

Accordingly, the variable area first and second exhaust nozzles 68 and 78 allow effective operation of the engine 10 in both the high-flow mode through the fan inner duct 56 with the VIGVs 70 and the second exhaust nozzle 78 in their open first positions and the first nozzle 68 in its first closed position; and in a low-flow mode through the fan inner duct 56 when the VIGVs 70 and the second exhaust nozzle 78 are disposed in their relatively closed second positions, and the first exhaust nozzle 68 is disposed in its open second position; and as required for positions thereinbetween for improving the overall operability of the engine 10 and matching the cycles of operation of the flades 66 and the fan 12. The first and second exhaust nozzles 68, 78 and the VIGVs 70 may be adjusted in conventional fashion for suitably varying the conventionally known performance maps of both the fan 12 and the flades 66 which also allows operation of the fan 12 at an elevated operating line and pressure ratio consistent with minimum fan stall margin requirements. The elevated operating line of the fan 12 also increases the supercharging effect into both the booster compressor 26 and the flades 66, with the increased supercharging and the higher pressure ratio of the flades 66 in the high-flow mode combining to greatly increase the overall pressure ratio and resulting thrust from the engine 10. Additional fuel as required is provided to the combustor 18 for powering the core engine 32 for driving the fan 12, booster compressor 26, and the flades 66 for generating the increased thrust from the engine.

For operation below the high-flow mode with the fan 12 operating below its maximum speed and maximum airflow, thrust output of the engine 10 is conventionally varied by varying the speed of the fan 12 which more efficiently utilizes the fuel, with the VIGVs 70 and second exhaust nozzle 78 remaining in their closed positions.

A major advantage of the variable cycle and variable specific thrust engine 10 disclosed above at the maximum, constant airflow through the fan 12 is the ability to employ a smaller fan for a given maximum thrust requirement. The higher specific thrust mode permits the fan 12 to be scaled down in size for improving installed performance of the engine 10 while retaining the capability of providing a suitable level of maximum thrust. And, the flades 66 may be differently configured for different applications with relatively low or relatively high pressure ratios effected thereby as required while still utilizing the common fan 12. Although the engine 10 may be developed as an entirely new engine family, it is possible to retrofit existing turbofan engines with the second splitter 52 and flades 66, and related components for further increasing the maximum thrust available from such engines.

Figure 4:
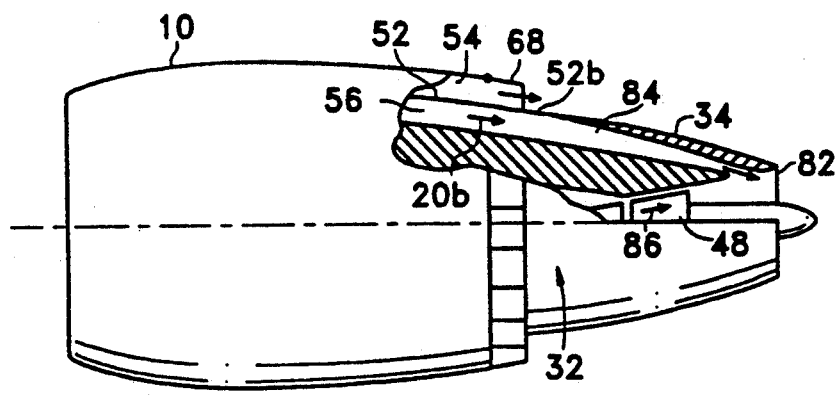
FIG. 4 is a partly sectional schematic representation of a high bypass turbofan aircraft gas turbine engine in accordance with a second embodiment of the present invention.

Although in the preferred embodiment illustrated in FIGS. 1 and 2, the outer and inner duct outlets 54b, 56b are shown concentric to each other and in a common vertical plane, the inner duct 56 may be joined to an exhaust nozzle 82 of the core engine 32 for discharging the fan air 20 from the fan inner duct 56 downstream of the LPT 48 for discharge therethrough as shown in the embodiment of the invention illustrated in FIG. 4. This second embodiment is substantially identical in operation to the first embodiment described above except that the second splitter aft end 52b is joined to the inner casing 34, and a bypass duct 84 extends in flow communication with the fan inner duct 56 inside the inner casing 34 for discharging the fan air middle flow 20b from the exhaust nozzle 82 along with the combustion gases 86 generated by the combustor 38 and channeled through the HPT 44 and the LPT 48.

Although the flades 66 in the form of compressor airfoils may be used for increasing specific thrust of the engine 10 as described above, in an alternate embodiment they may be used for extracting energy from the fan 12 for reducing specific thrust from the engine 10 for use in a smaller aircraft application, for example. In this embodiment, the rotor flades 66 as shown in FIG. 3 are in the form of turbine blades for extracting energy from the fan air middle flow 20b channeled therebetween. The flades 66 illustrated in FIG. 3 schematically represent either compressor blades or turbine blades since the airfoils thereof are configured generally similarly with concave and convex sides, with the specific configuration determining its use as a compressor blade requiring energy for further pressurizing the airflow channeled thereover, or a turbine blade which extracts energy therefrom and reduces its pressure. The respective airfoils of the compressor blade 60a and the rotor flade 66 are conventionally profiled, but with the shroud 64 therebetween, for obtaining the desired pressure ratios thereacross.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A turbofan gas turbine engine comprising:
   a fan disposed in a fan casing defining an annular fan duct for receiving fan air compressed by said fan;
   a booster compressor disposed in an annular first flow splitter and in serial flow communication with said fan;
   a second compressor disposed in an inner casing and in flow communication with said booster compressor, said inner casing extending aft of said first splitter and coextensively therewith;
   a combustor disposed in said inner casing and in flow communication with said second compressor;
   a high pressure turbine (HPT) disposed in said inner casing and in flow communication with said combustor, and fixedly joined to said second compressor for driving said second compressor;
   a low pressure turbine (LPT) disposed in said inner casing and in flow communication with said HPT, and fixedly joined to said fan and said booster compressor for driving said fan and booster compressor;

an annular second flow splitter disposed aft of said fan in said fan duct and spaced radially between said fan casing and said inner casing and first splitter to define a fan outer duct and a fan inner duct, said second splitter having a forward end defining with said fan casing an inlet of said outer duct, and defining with said first splitter an inlet of said inner duct;

said booster compressor including at least one stage of rotor blades, each blade having a shroud disposed coextensively with said first splitter and said inner casing for providing a flow boundary therewith, and an integral rotor flade extending radially outwardly from said shroud in said fan inner duct; and a variable area first exhaust nozzle disposed at an aft end of said fan casing and defining with said second splitter an outlet of said outer duct for discharging said fan air therefrom to atmosphere, said outer duct outlet having a selectively variable discharge flow area, and said first exhaust nozzle being positionable in a first position to reduce said outer duct outlet flow area to permit shifting of a portion of said fan air from said outer duct to said inner duct for flow between said flades to vary specific thrust of said fan air channeled through said outer and inner ducts.

2. An engine according to claim 1 further comprising:
a row of variable inlet guide vanes (VIGVs) disposed in said inner duct between said inlet thereof and said flades; and means for controlling said VIGVs and said first exhaust nozzle, said control means being operable:
to position said VIGVs in a first position to increase flow of said fan air through said inner duct and through said flade stage and concurrently to position said first exhaust nozzle in said first position thereof to reduce flow of said fan air therethrough; and to position said VIGVs in a second position to decrease flow of said fan air through said inner duct, and concurrently to position said first exhaust nozzle in a second position to increase flow of said fan air through said outer duct and said first exhaust nozzle.

3. An engine according to claim 2 wherein said rotor flades are in the form of turbine blades for extracting energy from said fan air channeled therebetween.

4. An engine according to claim 2 wherein said rotor flades are in the form of compressor blades for additionally compressing said fan air channeled therebetween from said fan for increasing specific thrust of said fan air discharged from said engine.

5. An engine according to claim 4 wherein said fan has a maximum operating speed for obtaining a maximum airflow therethrough, and said control means are effective for positioning said VIGVs and said first exhaust nozzle in said first positions thereof at said fan maximum speed, and for positioning said VIGVs and said first exhaust nozzle in said second positions thereof below said fan maximum speed.

6. An engine according to claim 5 wherein said second splitter has an aft end disposed radially inwardly from said fan casing aft end, and further comprising a variable area second exhaust nozzle disposed at said second splitter aft end and defining with said inner casing an outlet of said inner duct for discharging said fan air therefrom to said atmosphere, said inner duct outlet having a selectively variable discharge flow area, and said second exhaust nozzle being positionable by said control means in a first position to increase said inner duct outlet flow area when said VIGVs and said first exhaust nozzle are disposed in said first positions thereof, and in a second position to reduce said inner duct outlet flow area when said VIGVs and said first exhaust nozzle are disposed in said second positions thereof.

7. An engine according to claim 5 wherein said second splitter has an aft end joined to said inner casing, and further including a bypass duct extending in flow communication with said fan inner duct inside said inner casing for discharging said fan air from said fan inner duct downstream of said LPT for discharge from a core engine exhaust nozzle.

* * * * *